United States Patent

[11] 3,562,558

[72] Inventor Floyd M. Totten
Cedar Rapids, Iowa
[21] Appl. No. 769,285
[22] Filed Oct. 21, 1968
[45] Patented Feb. 9, 1971
[73] Assignee Collins Radio Company
Cedar Rapids, Iowa
a corporation of Iowa

[54] DELAY LINE CONTROL GATED MICROLOGIC CLOCK GENERATOR
8 Claims, 2 Drawing Figs.

[52] U.S. Cl. 307/269, 307/208, 307/215, 307/265; 328/56, 328/92; 331/111
[51] Int. Cl. H03k 5/00
[50] Field of Search 307/201, 208, 214, 215, 217, 232, 234, 238, 247, 260, 261, 262, 265, 266, 268, 269; 328/55, 56, 59, 92, 93, 99; 331/111, 113

[56] References Cited
UNITED STATES PATENTS 3,054,072 9/1962 Beaulieu ........ 331/108
3,317,855 5/1967 Cho ........ 331/111
3,395,362 7/1968 Sutherland ........ 331/111X
3,426,219 2/1969 Cancro ........ 307/268

*Primary Examiner*—Stanley D. Miller, Jr.
*Attorneys*—Warren H. Kintzinger and Robert J. Crawford

ABSTRACT: A delay line and logic control gated micrologic circuit clock signal pulse train generator with each pulse waveform clock signal in synchronism with its initiating gate trigger signal. A NAND gate receives an activating gate trigger signal and immediately a voltage shift in NAND gate output with this is then passed through a delay line coil both to output path means and also back as an additional input inhibit for the NAND gate at a predetermined delay determined by the delay line. The immediately resulting voltage shift at the NAND gate output is again passed through the delay line coil with the same delay to then remove the inhibit signal from the NAND gate with again an immediate shift in the NAND gate output voltage, and with the pulse generating cycle continually repeating itself with precise pulse width and spacing between pulses in a pulse train in synchronism although delayed from the start of the activating gate trigger signal with the pulse train cycle generating action continued just so long as the activating gate trigger signal is applied.

Figure 1:
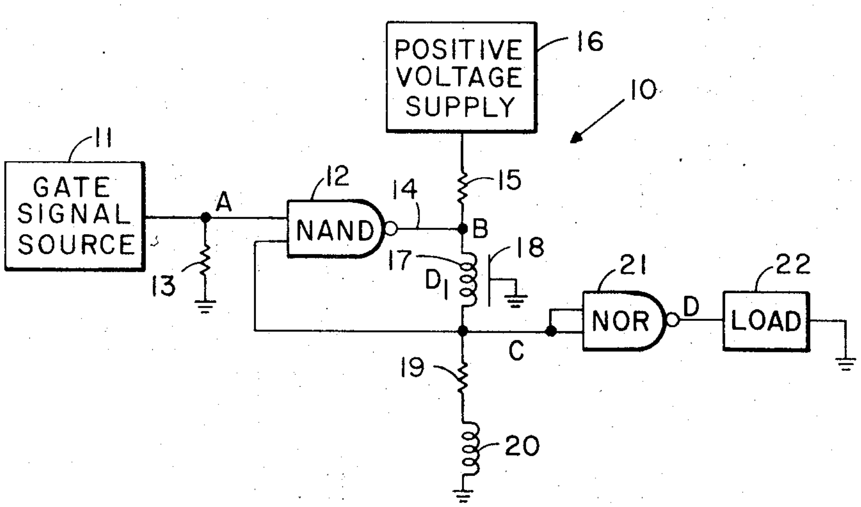

INVENTOR.
FLOYD M. TOTTEN
BY Warren H. Kintzinger
ATTORNEY

DELAY LINE CONTROL GATED MICROLOGIC CLOCK GENERATOR

This invention relates in general to clock signal generators, and in particular, to a delay line and logic control gated micrologic clock signal generator Heretofore, there have been difficulties in obtaining an accurate pulse waveform signal clock for test standards with the clock in synchronism with a gate trigger signal. Such precise time gated clock signals would also be quite useful as a counter timing standard or as a shift register control input. Many of the preexisting difficulties have arisen because preexisting techniques would not provide precise initiation of a pulse clock signal train from an initiating time gage. Furthermore, many of the preexisting systems required a high degree of complexity in order to achieve any reasonable acceptable degree of timing control. These also imposed undersired power demands, generally more maintenance, and have been more expensive then desired.

It is, therefore, a principal object of this invention to provide for generating pulse waveform clock signals in synchronism with respective initiating gate trigger signals.

A further object is to provide such operational results with a gated micrologic clock signal generator with minimized power requirements, much less complexity than many preexisting systems, and at much less expense.

Features of this invention useful in accomplishing the above objects include, in a gated micrologic clock signal generator, delay line and logic control for pulse waveform clock signal synchronism with an initiating gate trigger signal. The clock signal generator includes a NAND gate connected for receiving a gate input signal and developing an inverted output connected through a delay line coil to both an output connective path and also back as an additional input to the NAND gate. A micrologic NOR gate in the output connective path with some circuit installations is useful in providing a load buffering function for the circuit and also to invert the signal.

A specific embodiment representing what is presently regarded as the best mode of carrying out the invention is illustrated in the accompanying drawing.

Figure 2:
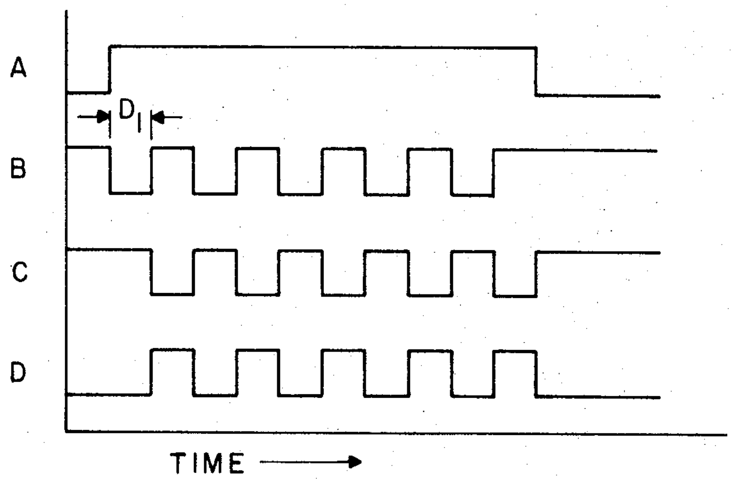

In the drawing:

FIG. 1 represents a schematic and block diagram of a delay line control gated micrologic clock generator; and FIG. 2, a family of four waveforms A, B, C, and D as these waveforms appear at locations A, B, C, and D in the circuit of FIG. 1.

Referring to the drawing:

In the delay line and logic control gated micrologic clock signal generator 10 of FIG. 1, a gate signal source 11 is connected as an input to NAND gate 12 with the junction of the gate signal 11 and NAND gate 12 connected through resistor 13 to ground. The output line 14 of NAND gate 12 is connected to and through resistor 15 to positive voltage supply 16. The output line 14 of NAND gate 12 is also connected to and through a coil 17, having a grounded shield 18, back as an additional input to NAND gate 12 and also serially on through resistor 19 and coil 20 to ground. The junction of grounded shield coil 17 and resistor 19 is also connected to two input terminals of NOR gate 21, the output of which is connected to load 22.

Referring also to FIG. 2, waveform A is a signal supplied by gate signal source 11, appearing at location A in FIG. 1, as an input to NAND gate 12. Operationally during the quiescent state with the input at A a low voltage (or ground), the NAND gate is held in the "off" condition. However, immediately upon the gating relatively higher voltage signal being applied, the output B of NAND gate 12 that is otherwise normally in a high voltage state through the quiescent state, as indicated by waveform B, is immediately shifted downward to relatively a low voltage state. With the shielded coil 17 acting as a delay line having a delay of $D_1$ therethrough, as indicated with the waveform B, the junction of coil 17 and resistor 19 and location C shifts from a high voltage to a low voltage state, as shown by C. This voltage shift simultaneously as a second input inhibits NAND gate 12. This in turn immediately substantially simultaneously results in the waveform B immediately again being returned to a high voltage state that again acts through the delay line coil 17 with delay $D_1$ to the junction of coil 17 and resistor 19 and location C to remove the inhibit input to NAND gate 12. This then immediately permits waveform B to return from the high voltage state back down to the low voltage state again as long as the higher gating waveform A voltage is maintained. Thus, the two waveforms B and C are developed with the cycle continuing until the gate voltage input at A is removed. The waveform C is suitable for utilization directly if desired or, when applied to the two input connections of NOR gate 21 and inverted through the NOR G gate circuit 21, to provide an inverted output waveform D for a utilizing load 22. NOR gate 21, in addition to inverting the clock signal, also isolates the load 22 from the generator in a load buffering function and tends to restore the rise and fall time of the clock generator output pulses.

Components and values used in a delay line and logic control gated micrologic circuit clock signal generator generating a train of pulses spaced in 1.45 microsecond intervals, as determined by the delay $D_1$ of delay line coil 18, required in the reply pulse circuitry of an aircraft transponder, include the following:

| | |
|---|---|
| NAND gate 12 | DTL 946 |
| Resistor 13 | 100 Ohms |
| Resistors 15 and 19 | 820 Ohms |
| Positive voltage supply 16 | 5 volts DC |
| Grounded shield coil 17 | 0.725 $\mu$ second delay |
| Coil 20 | 47 $\mu$h |
| NOR gate 21 | DTL 946 |

Thus, there is hereby provided a delay line and logic control gated micrologic circuit clock signal generator generating an output train of pulses with predetermined spacing required in transponder reply pulse circuitry for circuit test. It is a delay line and logic control gated pulse train generator that may be used as a clock for a computer system and in many other applications and test devices.

Whereas this invention is here illustrated and described with respect to a single embodiment thereof, it should be realized that various changes may be made without departing from the essential contributions to the art made by the teachings hereof.

I claim:

1. In a signal clock generator, a NAND gate circuit having a gating signal input connection and an inhibit input signal connection, and output signal connective means; a delay line coil having one end connected directly to said NAND gate output connective means, and the other end directly to said inhibit signal connection; and output signal path means connected to a point in the circuit after said output signal connective means of said NAND gate circuit.

2. The signal clock generator of claim 1 wherein, said delay line coil is included as part of a voltage bias circuit connected between a voltage supply and a voltage potential reference source.

3. The signal clock generator of claim 2 including, impedance means between said delay line coil and said voltage potential reference source.

4. The signal clock generator of claim 3 wherein, said impedance means includes series connected resistive means and inductive coil means.

5. The signal clock generator of claim 3 wherein, the point of connection of said output signal path means is the junction of said delay line coil and said impedance means.

6. The signal clock generator of claim 5 wherein, said output signal path means includes a NOR gate circuit having two input connections connected to the junction of said delay line coil and said impedance means; and with the NOR gate circuit having an output connection for connection to a utilizing load.

7. The signal clock generator of claim 2 wherein, said delay line coil has a coil shield and said coil shield is connected to said voltage potential reference source.

8. The signal clock generator of claim 2 including resistive means in said bias voltage circuit between said delay line coil and said voltage supply.